(12) United States Patent  (10) Patent No.: US 7,571,275 B2
Nelson  (45) Date of Patent: Aug. 4, 2009

(54) FLASH REAL-TIME OPERATING SYSTEM FOR SMALL EMBEDDED APPLICATIONS

(75) Inventor: Les Nelson, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 320 days.

(21) Appl. No.: 11/216,749

(22) Filed: Aug. 31, 2005
(Under 37 CFR 1.47)

(65) Prior Publication Data

US 2007/0050535 A1  Mar. 1, 2007

(51) Int. Cl.
G06F 12/00 (2006.01)
(52) U.S. Cl. .................................. 711/103; 365/185.33
(58) Field of Classification Search ................... 711/103
See application file for complete search history.

(56) References Cited

U.S. PATENT DOCUMENTS

| | | | |
|---|---|---|---|
| 5,247,658 A | | 9/1993 | Barrett et al. |
| 5,404,485 A | | 4/1995 | Ban |
| 5,682,497 A | | 10/1997 | Robinson |
| 5,737,742 A | | 4/1998 | Achiwa et al. |
| 5,787,445 A | | 7/1998 | Daberko |
| 5,832,515 A | * | 11/1998 | Ledain et al. ................ 707/202 |
| 5,987,478 A | | 11/1999 | See et al. |
| 6,160,501 A | * | 12/2000 | Tallam ......................... 341/60 |
| 6,412,041 B1 | | 6/2002 | Lee |
| 6,535,949 B1 | * | 3/2003 | Parker ......................... 711/103 |
| 6,678,785 B2 | | 1/2004 | Lasser |
| 6,813,678 B1 | * | 11/2004 | Sinclair et al. .............. 711/103 |
| 7,257,690 B1 | * | 8/2007 | Baird .......................... 711/162 |
| 2002/0035416 A1 | * | 3/2002 | De Leon ....................... 701/14 |
| 2003/0046482 A1 | | 3/2003 | Venkiteswaran |
| 2004/0133720 A1 | * | 7/2004 | Slupsky ....................... 710/100 |
| 2005/0055496 A1 | | 3/2005 | Nallapa |

* cited by examiner

Primary Examiner—Kevin L Ellis
Assistant Examiner—Matthew Bradley
(74) Attorney, Agent, or Firm—Kinney & Lange PA

(57) ABSTRACT

A flash real time operating system for embedded applications employing flash memory is capable of storing and accessing individual bytes of data corresponding to a particular logical address in real time. The operating system writes data bytes to sequential physical blocks within the flash memory. Physical blocks written with data bytes corresponding to the same logical address are connected by a linked list, which is dynamically modified to reduce access times required to read and write data to the flash memory. The operating system also monitors the number of physical blocks written with data within each physical sector. When one physical sector reaches its storage capacity, the operating system transfers the physical blocks holding valid data from the old physical sector to a new, previously erased physical sector.

20 Claims, 5 Drawing Sheets

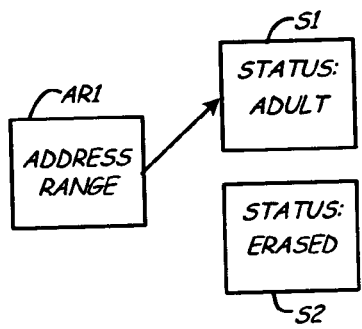
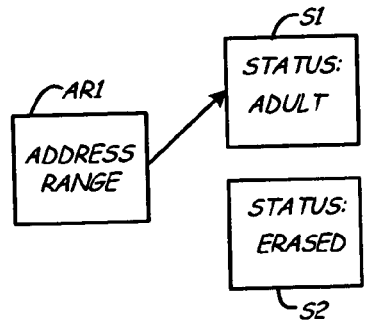
*Fig. 5A*  *Fig. 5B*
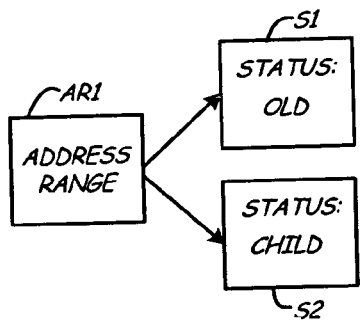
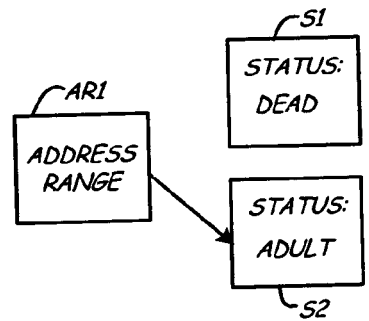
*Fig. 5C*  *Fig. 5D*
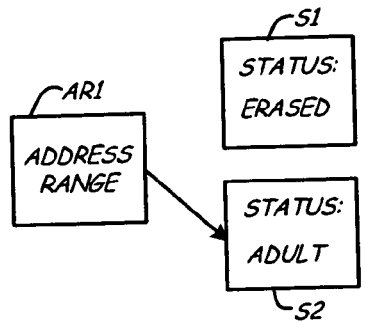
*Fig. 5E*

US 7,571,275 B2

FLASH REAL-TIME OPERATING SYSTEM FOR SMALL EMBEDDED APPLICATIONS

BACKGROUND OF THE INVENTION

An embedded application is a computer system that is a component within a larger system. In embedded applications, it is often necessary to store data to non-volatile memory in order to maintain valid data despite removal of power. This is in contrast with volatile memory (typically random access memory (RAM)) that requires power at all times to maintain valid data. Typically, non-volatile memory is implemented with a special chip called an EEPROM (electrically eraseable, programmable read only memory). The storage of data to the EEPROM is typically controlled by a microprocessor, a microcontroller or digital signal processor (often referred to as a "controller") located within the embedded system. During operation, when the controller needs to store data to the EEPROM, it performs a simple write operation. Likewise, if the controller needs to read data previously stored to the EEPROM, it performs a simple read operation. If data previously written to the EEPROM needs to be updated (i.e., new data is going to replace old data), then the write operation simply over-writes this old data with the new data. EEPROMs therefore allow easy updating and writing of data. However, EEPROMs are limited in the total amount of data that can be stored. For applications that require greater storage capacity in a small amount of space, a type of non-volatile memory known as flash memory is a better choice.

Flash memory, although providing greater storage density than EEPROM devices, presents some obstacles not found in EEPROM devices. The biggest difference between flash memory and EEPROM memory is that flash memory locations cannot be overwritten. When a flash memory module is initialized, every location is initialized to a logic level of "1". When data is written to a logical address, selected bits within the flash module are converted from a logic level of "1" to a logic level of "0". However, data bits cannot be individually written from a logic level of "0" back to a logic level of "1". Therefore, writing to a location for a first time within the flash memory is easily done, with a simple write operation similar to the EEPROM write operation. Writing new data to a previously written location within the flash memory is not easily done, and in fact requires that the location be erased (i.e., set to a logic level of "1") before the location can be written again.

Another obstacle presented by flash memory is the inability to erase or initialize individual locations within the flash memory. Erasing a particular location within the flash memory requires that most of the adjacent locations also be erased. If a particular location within the flash memory is to be updated with new data, data stored in the adjacent locations must be stored temporarily while the particular location (and adjacent locations) are erased, then updated data corresponding to the particular location as well as data stored in the adjacent locations must be rewritten.

In many applications, these obstacles do not present a problem or the problem may be avoided. For instance, flash memory is often used to store pictures on digital cameras or music on portable music players. These applications make use of a circular buffer, in which data is written at progressive memory locations. When the end of the buffer is reached, the buffer wraps around to the beginning, erasing the old data and storing new data. This type of system, however, only allows data to be written in a sequential manner, which works well for applications like music or digital photos in which the data is naturally sequential. For example, a digital image is stored as a series of sequential data words.

Other applications make use of a flash management system to allow the overwriting of old data. These systems typically run on top of a standard operating system, which means they use the filing system provided by the standard operating system, (e.g., the FAT16 filing system used by DOS). These filing systems are only capable of storing entire files (which vary in length from a few bytes to a thousands of bytes), and therefore require considerable overhead in processing power in order to utilize flash memory devices for data storage. Each time a change, however small, is made to a particular file, the filing system must rewrite the entire file to a new section of flash memory. While these systems manage the obstacles discussed above with regard to flash memory, they are unable to operate in real-time, as the host operating system and file storage system will introduce delays into the write and read access times. In particular, delays are introduced because the filing system used by these operating systems only allows individual files to be stored, rather than individual bytes. File-oriented systems, as opposed to byte-oriented systems, are not well suited for embedded applications which store small amounts of data to memory at a time. Therefore, a system that would allow embedded systems (which require the ability to overwrite old data and operate in real time) to utilize high storage capacity flash memory is desirable.

BRIEF SUMMARY OF THE INVENTION

In one aspect, the present invention is a method and an apparatus embodying the method of utilizing flash memory in an embedded application. The method includes writing new data bytes corresponding to a first logical address to a current physical block in the flash memory identified by location data stored to a write pointer. The location of the current physical block, stored in the write pointer, is stored to a previously written physical block corresponding to the first logical address. By storing the location of the current physical block to the previous written physical block, the current physical block is added to a linked list of physical blocks related to the first logical address. The location data stored in the write pointer, currently corresponding to the current physical block, is then incremented to identify a next, unwritten physical immediately following the current physical block.

BRIEF DESCRIPTION OF THE DRAWINGS

FIGS. 5A-5E are functional block diagrams showing how address ranges are transferred to new physical sectors.

DETAILED DESCRIPTION

Figure 1:
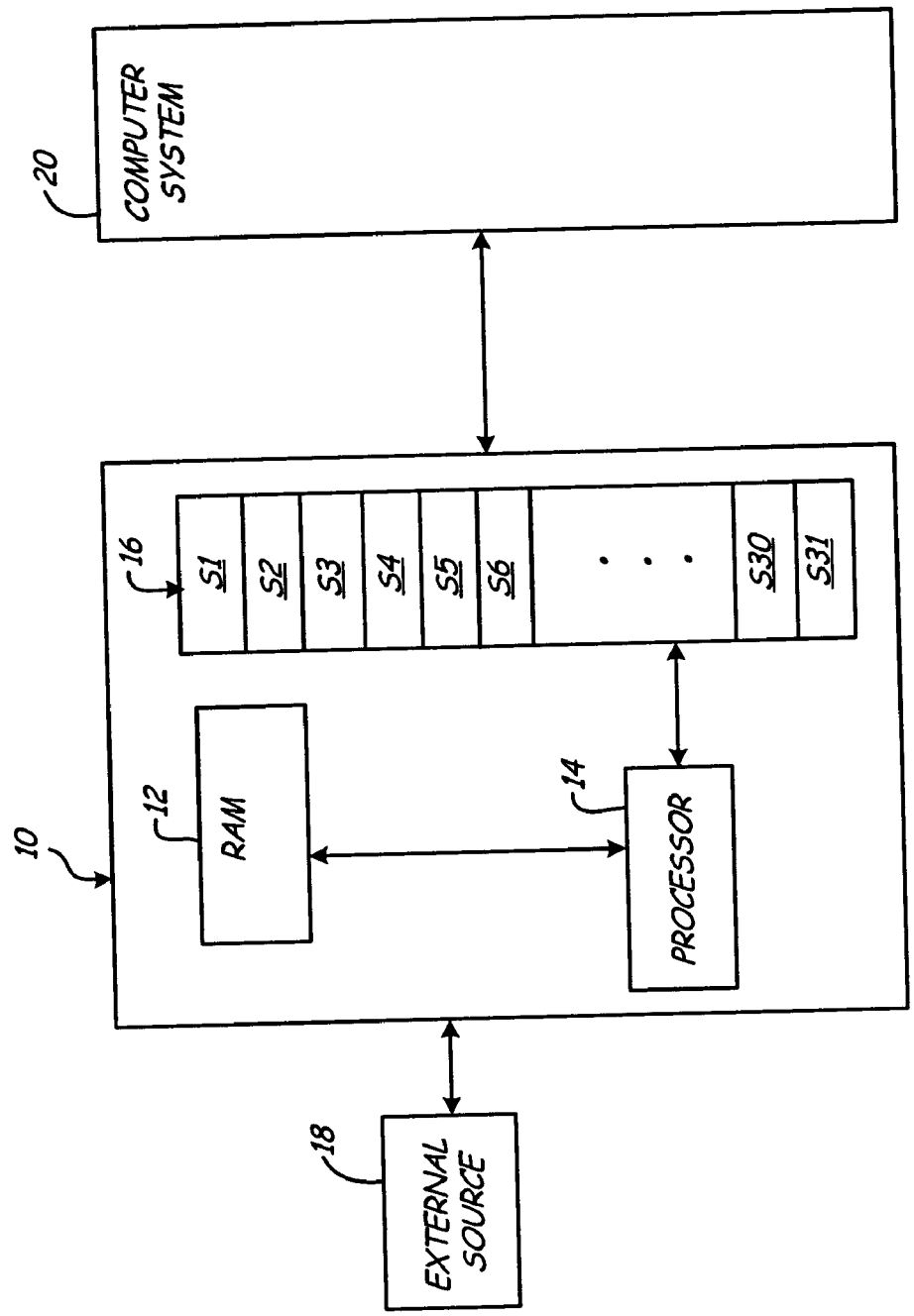
FIG. 1 is a block diagram of an embedded system utilizing a flash memory module.

FIG. 1 shows embedded system 10 of the present invention, including random access memory (RAM) 12, controller 14, and flash module 16. The system 10 could be part of a data memory module (DMM) commonly used on aircraft, or part of another suitable device. External data source 18 and computer system 20 are connected to embedded system 10. Embedded systems require non-volatile memory storage in order to maintain valid data after power has been removed. Electrically eraseable, programmable, read only memories ("EEPROMs") have been the most popular choice for embedded systems, because of their ability to retain data after power has been removed, along with the ability to write over old data. However, EEPROMs are limited in the amount of data they can store, and for applications that require large amounts of storage in a small amount of space, flash memory is required. While flash memory typically provides faster access than EEPROM, and an increase in overall storage capacity, using flash memory presents two obstacles. First, flash memory cannot be overwritten as EEPROM can. To write flash memory, the location to be written must first be initialized or erased to a logic level of "1". Bits can be written to a logic level of "0", but once written, bits with a logic level of "0" cannot be written back to a logic level of "1" without first erasing the bit. Second, flash memory can only be erased in large portions. In order to erase an individual bit within flash module, an entire sector (e.g. 64 kilobytes) must be erased. A sector is defined here as the smallest unit within flash memory that can be individually erased. As shown in FIG. 1, flash module 16 is divided into thirty-one physical sectors S1-S31. To be useful in embedded applications (particularly embedded systems used for real time control of systems), managing data storage and retrieval must be done in real time.

The present invention provides an operating system for an embedded system using flash memory for non-volatile storage of data. The operating system provides everything necessary to make the flash chip useable, including formatting, configuration, access, and background housekeeping functions time-shared with main program execution without the overhead of a full operating system. The following description focuses on the aspects of the operating system that allow flash memory to be used for non-volatile storage in a real time environment. Typical flash systems employed in embedded systems known in the prior art are constrained by access times required to read and write files to a flash module. Therefore, the portions of the flash operating system that deal with main program execution are not discussed in detail. Rather, this description discusses how the flash operating system manages data storage and retrieval within flash module 16 in a real time environment.

Figure 2:
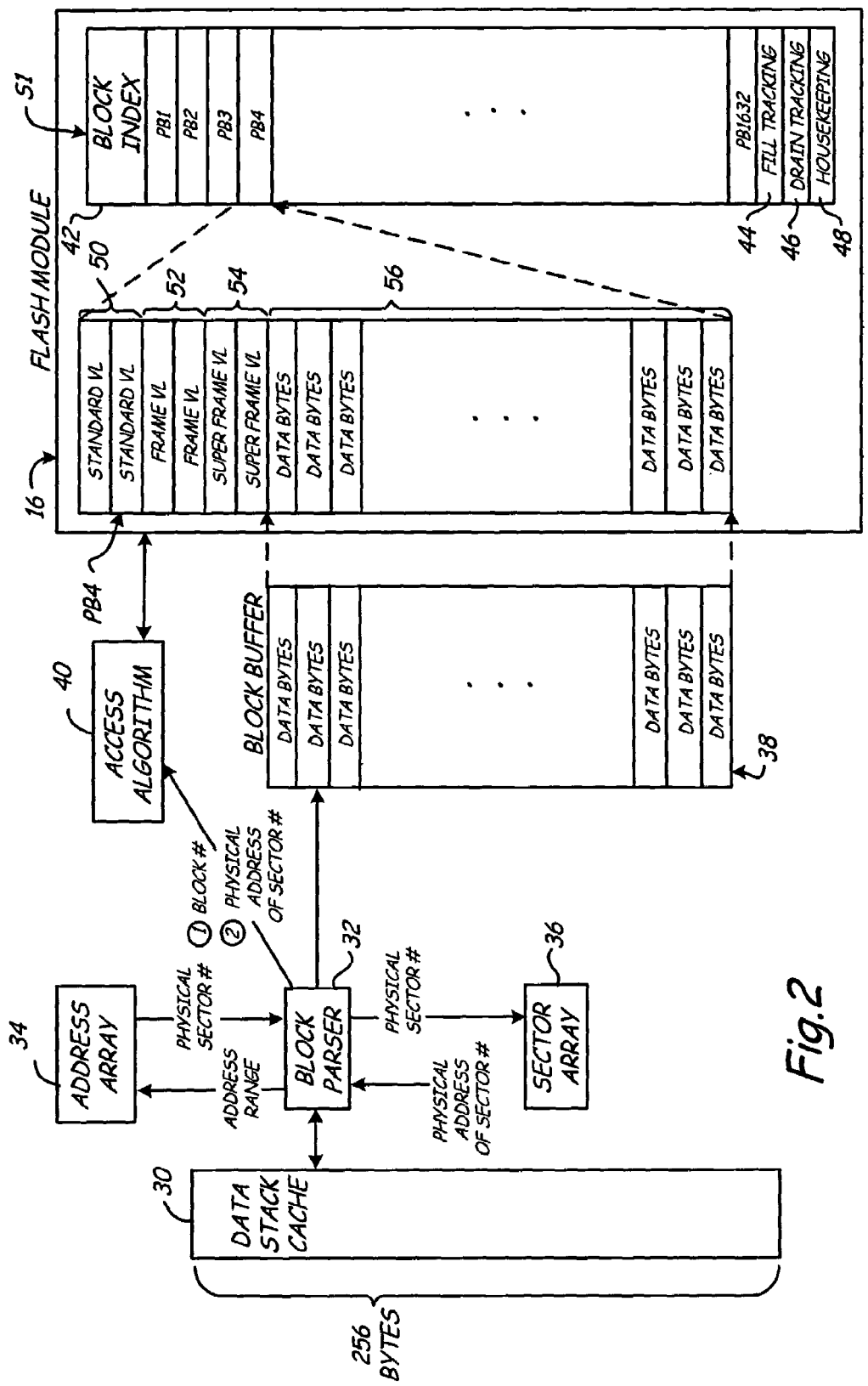
FIG. 2 is a block diagram of the functional components of the flash operating system during a write operation to the flash memory module.

FIG. 2 shows the main software entities of an embodiment of the flash real time operating system (hereinafter, "operating system") for reading and writing to flash module 16. The software entities include data stack cache 30, block parser 32, address array 34, sector array 36, block buffer 38 and access algorithm 40. These entities allow data bytes to be written to and later read from flash module 16. As discussed with respect to FIG. 1, flash module 16 includes thirty-one physical sectors S1-S31. FIG. 2 shows the architecture of physical sector S1, including block index 42, physical blocks PB1-PB1632, fill tracking area 44, drain tracking area 46, and housekeeping area 48. In the exemplary embodiment shown, data bytes located in block buffer 38 are written to physical block PB4 of physical sector S1. The architecture of physical block PB4 includes standard vector links 50, frame vector links 52, super-frame vector links 54, and data byte storage area 56 which stores thirty-two bytes of data.

Before delving into the specifics of how the operating system manages data storage to flash module 16, it is helpful to discuss a few concepts and definitions that will be used throughout the remainder of this description. The first is the difference between logical addresses and physical addresses. A logical address is where a user thinks a particular piece of information is being saved. A physical address is the actual location within flash module 16 in which the information is stored. For instance, an exemplary embodiment of the present invention uses twenty-five ranges of logical addresses of logical address ranges AR1-AR25 (not shown). Each logical address range is assigned to one of the thirty-one physical sectors S1-S31 (although as will be shown, during operation logical address ranges will be reassigned to different physical sectors.) With twenty-five logical address ranges assigned to twenty-five physical sectors, six physical sectors are left unassigned. As discussed in more detail below, as one physical sector fills up with data, the address range assigned to that physical sector is reassigned to an unassigned and currently erased physical sector. Therefore, at different points in time, logical address ranges AR1-AR25 are assigned to different physical sectors S1-S31.

Each logical address has three separate parts: a logical address range, a logical block number, and a logical block position. The logical address range, as discussed above, is used by the software entities shown in FIG. 2 to determine which of the thirty-one physical sectors S1-S31 should be written to within flash module 16. The logical block number is used to find the correct physical block number within the selected physical sector to write or read a block of data, although writing to a logical block number does not result in writing to the same. numerical physical block number (i.e., writing to a first logical block address does not always result in writing to a first physical block). Finally, the logical block position allows for data bytes to be placed in the correct position within the block of data being written to flash module 16.

The process of writing data bytes to flash memory 16 begins by placing the data bytes having adjacent logical addresses in data stack cache 30, which is implemented as a stack array in RAM 12 (FIG. 1). Data stack cache 30 in this embodiment stores up to 256 bytes of data, although only thirty-two bytes of data will be written at a time to flash module 16. Block parser 32 is provided with the lowest logical address of the data bytes stored in data stack cache 30, as well as the number of bytes with adjacent logical addresses to be written to flash module 16. Block parser 32 divides the lowest logical address into the three components discussed above: logical address range (AR1-AR25), logical block number, and logical block position. Therefore, the operating system logically divides flash memory module 16 into twenty-five address ranges AR1-AR25. Each address range is divided into 1,512 logical block numbers, and each logical block number has thirty-two logical bit positions. The logical division of flash memory is separate from the physical architecture of flash module 16, shown in FIGS. 2 and 3. Block parser 32 provides the logical address range to address array 34 (implemented by RAM 12), which determines which physical sector S1-S31 is currently assigned to the particular logical address range and provides block parser 32 with the appropriate physical sector number S1-S31. Block parser 32 provides the physical sector number (in this case, physical sector S1 is shown) assigned to the relevant address range to sector array 36 (implemented in RAM 12), which uses the physical sector number to look up the physical address of physical sector S1 within flash module 16.

Block parser 32 also takes data bytes from data stack cache 30 and places them in block buffer 38 according to the logical bit position of the lowest logical address initially provided to block parser 32. Depending on the logical bit positions of the data bytes in data stack cache 30 and the number of data bytes to be written, block buffer 38 will not always contain 32 data bytes of new data, but will often contain only a few data bytes of new data. Because writes to flash module 16 are always carried out in groups of thirty-two bytes in this embodiment, any positions within block buffer 38 not containing new data must be filled with old, still valid data, previously stored to flash module 16 in order to preserve the old data. In order to fill block buffer 38 with the old, still valid data, block parser 32 operates in conjunction with access algorithm 40.

Block parser 32 provides access algorithm 40 with the physical sector address retrieved from sector array 36 and the logical block number derived from the lowest logical address of data stored in data stack cache 30. Access algorithm 40 uses the physical sector address provided by sector array 36 and the logical block number portion of the logical address to find the most recently written physical block corresponding to the logical address to be written. The physical sector address provided in this example points to the beginning of physical sector S1 and the beginning of block index 42. Block index 42 is divided into addressing locations (not shown), wherein each of the addressing locations corresponds to a logical block number (i.e., a first logical block number corresponds with a first addressing location). Each logical block number corresponds with thirty-two logical addresses, because each physical block holds thirty-two bytes of data. Addressing locations are used to provide the location of a physical block first written with respect to a particular logical address having a particular logical block number. A linked list (shown in FIG. 3) connects the first physical block written with respect to the particular logical address to subsequently written physical blocks written with respect to the particular logical address. During a write operation, block index 42 and the linked list allow access algorithm 40 to locate the most recently written physical block with respect to a particular logical address. Valid data stored in the most recently written physical block is provided to block buffer 38 as required to ensure all old, valid data is preserved by the write operation. The same operation is used during a read operation to find the most recently written data corresponding to a particular logical address. After transferring valid data from the most recently written physical block to empty block positions within block buffer 38, block parser 32 aligns block buffer 38 with the last 32 bytes (the first six are reserved for access algorithm 40) of a new, previously unwritten physical block (physical block PB4 in this case), and all 32 data bytes (including new data and old, valid data) stored in block buffer 38 are written.

Figure 3:
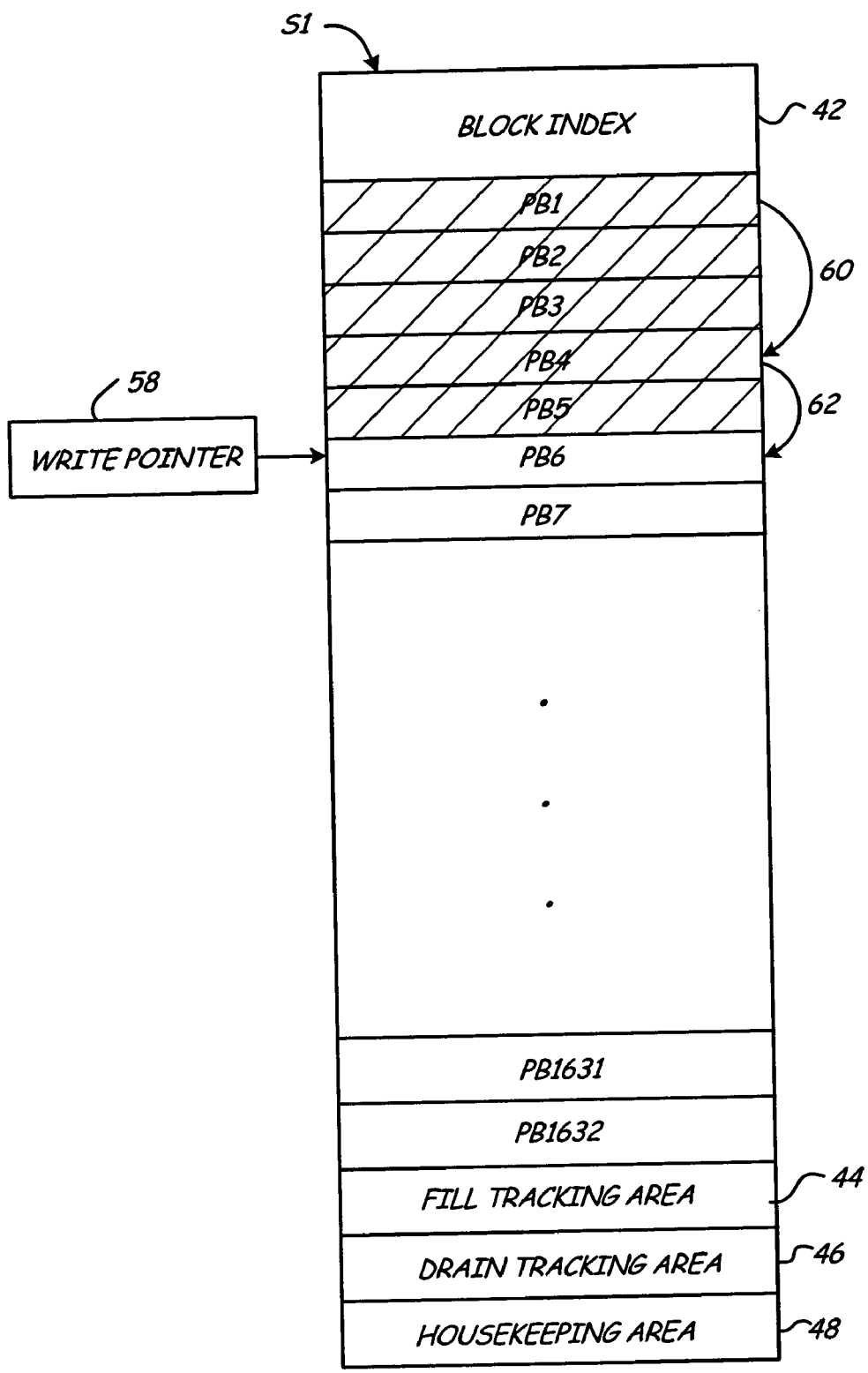
FIG. 3 is a block diagram of the architecture of an individual physical sector located within the flash memory module.

FIG. 3 shows an exemplary embodiment of how the present invention conceptually writes bytes of data corresponding to a logical address due to the unique nature of flash memories. As discussed above, the architecture of physical sector S1 (and all other physical sectors) includes block index 42, physical blocks PB1-PB1632, fill tracking area 44, drain tracking area 46 and housekeeping area 48. For each logical block number that can be written to physical sector S1, an addressing location consisting of two bytes is reserved in block index 42 to point to the location of a first physical block written with respect to the logical block number.

In this example, physical blocks PB1-PB5 have already been written, i.e., they contain data. Write pointer 58 is used by the operating system to hold the location of the next unwritten physical block, in this case, physical block PB6. For example, if a physical sector has not yet been written to, then write pointer 58 is initiated to point to physical block PB1. After physical block PB1 has been written, write pointer 58 is incremented to point to physical block PB2, and so on. Write pointer 58 is stored as a variable within sector array 36, and each sector has its own write pointer value. Write pointer is also stored in fill tracking area 44 of each sector. By storing the write pointer data to non-volatile memory (in flash module 16), the current position of the write pointer is maintained even if power is removed. Each time a block of data is written to the sector, one bit in the fill tracking area is changed from a "1" to a "0". By reading the number of bits changed to "0", the next physical block location that is available to be written can be extrapolated. Thus, when physical block PB1 is written, one bit within the fill tracking area is changed to a "0". When physical block PB2 is written next, another bit within the fill tracking area is changed to a "0". By reading the two zeros in the fill tracking area, it can be determined that physical block PB3 is the next physical block available to be written, and write pointer 58 is adjusted to point to physical block PB3.

Because flash memory cannot be rewritten or written over, if data bytes corresponding to a logical address are to be updated with new data, the new data must be written to a new physical block location. By way of example, assume data corresponding to a first logical address having a first logical block number is initially written to physical block PB1. After writing physical block PB1, the location of physical block PB1 is written to the addressing location corresponding to the first logical block number. At a later time, after data corresponding to different logical addresses and different logical block numbers have been written to physical blocks PB2 and PB3, new data corresponding to the first logical address (or at least, the first logical block number) is written to physical block PB4, the next available unwritten physical block location at the time. Because addressing locations within block index 42 cannot be rewritten with the location of physical block PB4, a linked list is created between subsequently written physical blocks having data corresponding to the same logical address. Therefore, a linked list is created between physical block PB1 and physical block PB4, illustrated by arrow 60.

To write another block of data to the first logical address (or the first logical block number) at a time after data corresponding to a different logical address and different logical block number has been written to physical block PB5, data is written to the location pointed to by write pointer 58 (the next available unwritten physical block within the sector, in this case, physical block PB6), and the linked list created between physical block PB1 and physical block PB4 is extended by creating a link between physical block PB4 and physical block PB6, shown by arrow 62. In this way, data bytes corresponding to a logical address can be updated by writing the new data to a new physical block, and adding the new physical block to a linked list created between previous physical blocks written with respect to the same logical address (and therefore, same logical block number). Creating the link between physical block PB4 and physical block PB6 is done by traversing the linked list based on the logical address provided to find the most recently written physical block corresponding with the first logical address (physical block PB4 in our example). The contents of write pointer 58, which holds the location of the now most recently written physical block corresponding with the first logical address (in this case, physical block PB6), is then written into the appropriate vector links (standard vector links 50, frame vector links 52, or super-frame vector links 54 shown in FIG. 2) of physical block PB4. This creates a pointer from physical block PB4 to physical block PB6, allowing access algorithm 40 to traverse the linked list to find the most recently written data corresponding with this logical address. Write pointer 58 is then updated to point to the next unwritten physical block, in this case, physical block PB7.

This example illustrates a method of writing and rewriting data to flash memory 16. By writing new data to a next available physical block and connecting physical blocks written with data corresponding to a first logical address, individual data bytes associated with a logical address can be stored, updated and retrieved from flash memory 16.

Figure 4:
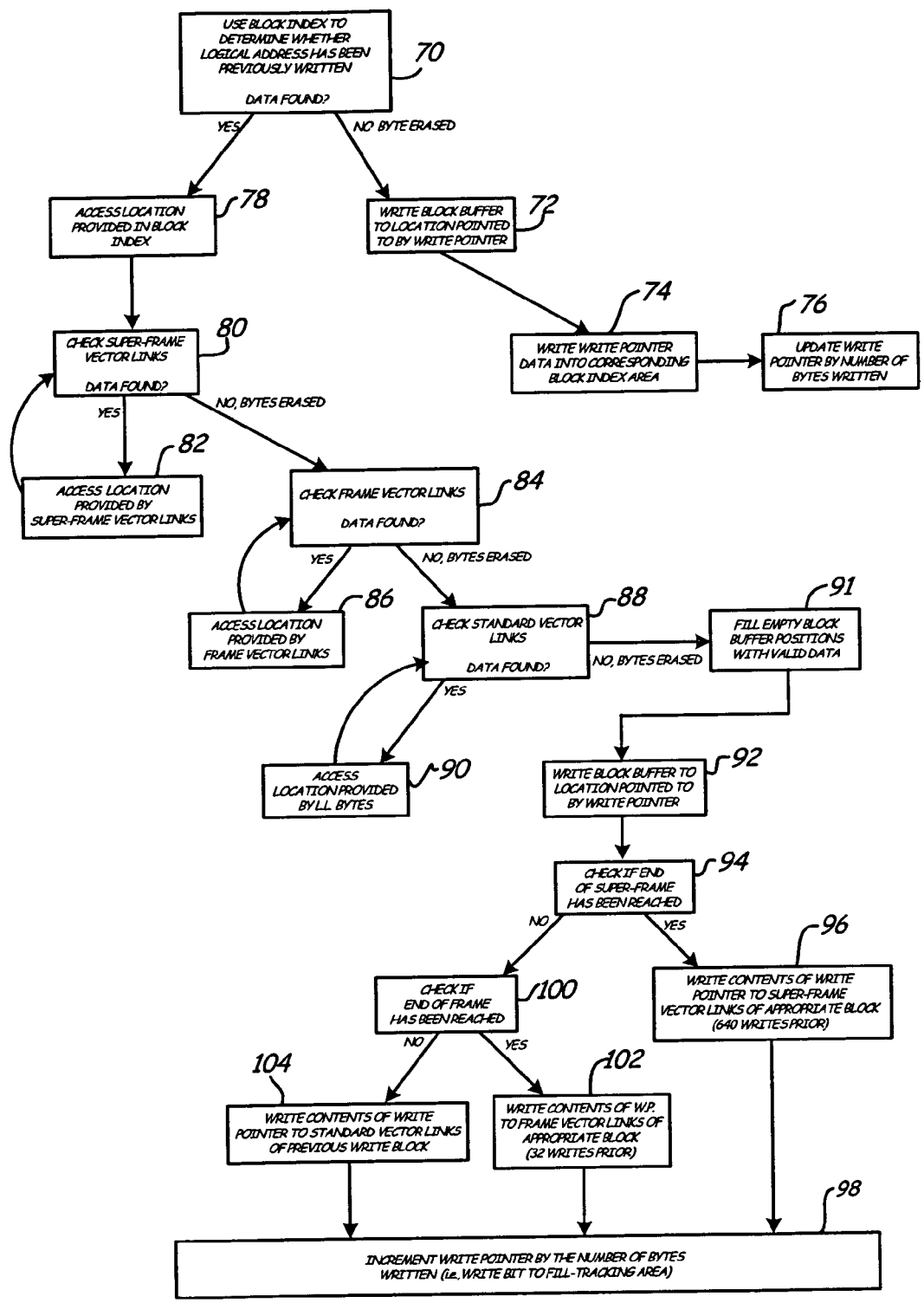
FIG. 4 is a flowchart of the access algorithm used to find the most recently written physical block as well as for maintaining dynamic linked list between physical blocks for fast access.

This example also illustrates the difference between logical addresses and physical addresses. Data bytes corresponding to a logical address can be written to a physical sector a number of times, resulting in a number of physical blocks holding data corresponding to a single logical address, although only one physical block will hold the most current data corresponding with the logical address. The physical blocks (PB1, PB4, and PB6 in the above example) corresponding to a particular logical address are connected by the linked list, allowing access algorithm 40 to find the most recently written data corresponding with the particular logical address. A problem that arises in using a linked list in this manner, however, is if a logical address is written to a physical sector over and over, so that the number of physical blocks that must be traversed increases, it causes an increase in read and write times. For some real time embedded systems, this may be unacceptable. FIG. 4 illustrates how access times can be kept to a minimum by reducing the time it takes to traverse a linked list to find the most recently written data corresponding to a particular logical address.

FIG. 4 is a flowchart illustrating the steps taken by block parser 32 and access algorithm 40 in writing data corresponding to a particular logical address to a physical block location within one of the plurality of physical sectors S1-S31. Access algorithm 40 is provided with the physical address of the physical sector, as well as the logical block number to be written. At step 70, access algorithm 40 accesses the physical sector using the physical address of the sector, and uses the logical block number to determine whether this logical address has previously been written to the physical sector. If the addressing location within block index 42 corresponding to the logical block number is erased, then data bytes corresponding to this logical block number (and therefore, this logical address) have not yet been written to this physical sector. If that is the case, access algorithm 40 directs block parser 32 to write the data stored in block buffer 38 to the physical block pointed to by write pointer 58 (shown in FIG. 3) at step 72.

After writing data stored in block buffer 38 to the physical block pointed to by write pointer 58, at step 74 the content of write pointer 58 (which points to the physical block location just written) is written into the addressing location of block index 42 corresponding to the logical block number of the data bytes just written. The next time data is to be written to or read from this logical address, block index 42 will contain data pointing to the physical block just written. At step 76, write pointer 58 is incremented by the number of physical blocks written. Writer pointer 58 is incremented by writing a bit in fill tracking area 44 for each physical block written.

Going back to step 70, if data is found in block index 42 corresponding to the logical block number to be written, it indicates that data bytes corresponding to this logical address have previously been written to this physical sector. Access algorithm 40 locates the most recently written physical block corresponding to this logical address by following pointers stored in each physical block to successively more recently written physical blocks written with data bytes corresponding to the logical address. To this end, each physical block contains six byte locations reserved for holding the location of subsequently written physical blocks corresponding to a logical address.

The first and second byte locations are reserved for standard vector links 50 (shown in FIG. 2), pointing to the next physical block holding data corresponding to the same logical address. The third and fourth byte locations are reserved for frame vector links 52 (shown in FIG. 2). The fifth and sixth byte locations are reserved for super-frame vector links 54. In this particular embodiment, a frame is defined as a linked list of thirty-two physical blocks, each physical block written with data corresponding to the same logical address, and a super-frame is defined as twenty frames of physical blocks written with respect to the same logical address.

The standard vector links 50, frame vector links 52, and super-frame vector links 54 allow the operating system to create a dynamic linked list that results in a decrease in access time. Standard vector links 50 connect successively written physical blocks corresponding to the same logical address. Frame vector links 52 connect physical blocks separated by a frame of intervening physical blocks written with data corresponding to the same logical address. Super-frame vector links 54 connect physical blocks separated by a super-frame of intervening physical blocks written with data corresponding to the same logical address. For example, if a logical address is written to a physical sector thirty-two times, a linked list is created between each successively written physical block using standard vector links 50. On the thirty-third write to the physical sector of this logical address, the linked list is modified by creating a second linked list or embedded linked list between the first physical block and the thirty-third physical block using frame vector links 52. This shortens the access time required to access the most recently written physical block, because access algorithm 40 uses the second linked list to access the thirty-third physical block from the first physical block, skipping the intervening thirty-two physical blocks. If a logical address is written a number of times, such that twenty frames of physical blocks have been written, the next write of data to the physical sector corresponding to the logical address results in the creation of a third linked list between the first physical block and the current physical block using super-frame vector links 54, allowing access algorithm 40 to bypass the intervening twenty frames (640 physical blocks) of physical blocks written with respect to the same logical address. Thus, the use of standard vector links 50, frame vector links 52 and super frame vector links 54 allows a linked list connecting physical blocks corresponding to the same logical address to be dynamically modified to minimize access times required to a most recently written physical block.

At step 78, access algorithm 40 accesses the physical block pointed to by the appropriate addressing location in block index 42. At step 80, access algorithm 40 determines whether super-frame vector links 54 of the physical block have been written. If super-frame vector links 54 contain valid data, it indicates that the logical address has been written to this physical sector at least six hundred and forty additional times, each time to a new physical block within the physical sector. Rather than access each of the intervening physical blocks, access algorithm 40 accesses the physical block pointed to by super-frame links 54 at step 82. The process (steps 80 and 82) is repeated by access algorithm 40 until a physical block is located that does not contain data written to super-frame links 54. When a physical block is found in which super frame links 54 are unwritten, access algorithm 40 determines whether frame vector bytes 52 of the physical block have been written at step 84. If data is found, it indicates this logical block address has been written at least thirty-two additional times since the current physical block location was written. If data is found, access algorithm accesses the physical block pointed to by data in frame vector links 52 at step 86. This prevents access algorithm 40 from having to traverse the linked list through the next thirty-two physical block locations. The process (steps 84 and 86) is repeated until access algorithm 40 finds a physical block with no data written to frame vector links 52. Frame vector links 52 and super-frame links 54 allow access algorithm 40 to quickly search physical block addresses written with respect to the same logical block number, without having to access each and every physical block written with respect to the same logical address.

At step 88, having found a physical block with no data written to frame vector bytes 52, access algorithm 40 checks standard vector bytes 50 (shown in FIG. 2) for data. If standard vector bytes 50 contain data, then access algorithm 40 accesses the physical block pointed to by data stored in standard vector bytes 50 at step 90. Standard vector bytes 50 provide the location of the next, successively written physical block corresponding to the same logical address. This process (steps 88 and 90) continues until access algorithm 40 finds a physical block location with no data written to standard vector bytes 50. A physical block with no data written to standard vector bytes 50 indicates that this physical block holds the most recently written data corresponding to this logical address. In other words, access algorithm 40 has reached the end of the linked list. At step 91, data stored by the physical block most recently written with data is read as necessary to complete any unfilled block positions within block buffer 38 in order to preserve valid data not being updated. At step 92, assuming block buffer 38 contains the necessary valid data bytes, the contents of block buffer 38 are written to a currently unwritten physical block pointed to by write pointer 58 (shown in FIG. 3).

After writing the data bytes stored in block buffer 38 to the current physical block (now containing data bytes), the location of the current physical block must be stored to a previously written physical block corresponding to the same logical address in order to add the current physical block to the linked list corresponding to the same logical address. At step 94, access algorithm 40 determines whether the end of a super-frame has been reached. At step 96, if access algorithm 40 determines the end of a super-frame has been reached, the content of write pointer 58 (holding the location of the current physical block) is written into super-frame vector links 54 of the physical block written 640 writes prior with respect to the same logical address. In this way, the next time access algorithm 40 writes to this logical address, access algorithm 40 avoids having to access the physical blocks located between the physical block written 640 writes prior and the current physical block holding the most recently written data corresponding to the same logical address. After writing the content of write pointer 58 at step 96, write pointer 58 is incremented at step 98 by the number of bytes written (i.e., another bit in the fill tracking area is written for each block written to the sector). This ensures write pointer 58 points to the next available unwritten physical block.

If the end of a super frame has not been reached, at step 100 access algorithm 40 determines whether the end of a frame has been reached. If the end of a frame has been reached, then at step 102 the content of write pointer 58 is written to frame vector links 52 of the physical block written thirty-two writes prior to the current write, corresponding to the same logical address. At step 98, the contents of write pointer 58 are incremented by the number of bytes written (i.e., another bit in fill tracking area 44 is written for each block written to the sector), so that write pointer 58 points to the next available, unwritten physical block location. If the end of a frame has not been reached, then at step 104 the content of write pointer 58 is written into standard vector links 50 of the previously written physical block associated with this logical address. At step 98, write pointer 58 is incremented by the number of bytes written, such that write pointer 58 points to the next available, unwritten physical block location. The algorithm discussed with respect to FIG. 4 therefore decreases the access time required to locate data bytes in flash module 16, as well as the time required to write new data bytes to flash module 16.

FIGS. 5A-5E illustrate how address ranges (address range AR1 is shown, but this example would apply to all address ranges AR1-AR25) are dynamically assigned to physical sectors S1-S31 by a component of the operating system called the sector transfer function. As discussed above, flash module 16 is divided into thirty-one physical sectors S1-S31. The operating system divided the memory available in flash module 16 into 25 logical address ranges AR1-AR25. Each logical address AR1-AR25 is assigned to a physical sector S1-S31. This leaves up to six physical sectors unassigned at any one time. Because of the nature of flash memory, which does not allow for overwriting of data, the amount of data stored to a physical sector continues to grow. At some point, each of the physical blocks within the physical sector will contain data, preventing new data from being stored to the physical sector. To prevent this situation, the sector transfer function transfers data from one physical sector to a new physical sector. During a sector transfer operation, only the most recently written physical block corresponding to a logical address and thus, most recently written data corresponding to a logical address is transferred. Thus, each linked list (however large) is condensed to a single physical block when transferred to the new physical sector, allowing for faster access times. Each physical sector is assigned one of the following five statuses: ERASED, CHILD, ADULT, OLD, and DEAD. The status of the sector is stored in housekeeping area 48 (shown in FIG. 2) of each physical sector S1-S31. The status of each sector is also stored in sector array 36. The status of the physical sector determines how the operating system handles read and write requests with respect to each physical sector. The following example illustrates the significance and reason for each of the sector status identifiers.

FIG. 5A shows physical sector S1 and physical sector S2. At this point in time, physical sector S1 is assigned to ADULT status, and physical sector S2 is assigned to ERASED status. As an ADULT sector, physical sector S1 is assigned to an address range (address range AR1 in this example). All read and write operations associated with address range AR1 are directed to physical sector S1. As an ERASED sector, physical sector S2 is not assigned to an address range, and each location within physical sector S2 is erased or set to a logic level of "1".

FIG. 5B also shows physical sectors S1 and S2. Physical sector S1 is still assigned to ADULT status, and physical sector S2 is still assigned to ERASED status. However, at this point in time, the number of physical blocks within physical sector S1 containing data has reached a threshold limit. In one embodiment, the threshold limit is reached when 60% of the physical blocks within a physical sector contain data. The number of physical blocks written within physical sector S1 is determined based on the value of write pointer 58, or the number of bits written in fill tracking area 44. Upon reaching the threshold limit, the operating system initiates the sector transfer function.

FIG. 5C shows the first step in a sector transfer process. Physical sector S1, previously assigned to ADULT status, is now assigned to OLD status. Physical sector S2, previously assigned ERASED status, is now assigned CHILD status.

Address range AR1, previously assigned to sector S1, is now assigned to physical sector S2 as well. Address range AR1 is therefore assigned to both physical sector S1 and physical sector S2.

By changing the status of physical sector S1 from ADULT to OLD, the operating system no longer writes new data bytes to physical sector S1. By changing the status of physical sector S2 from ERASED to CHILD, the operating system directs writes of data bytes corresponding to logical address range AR1 to physical sector S2. Data bytes corresponding to a logical address within logical address range AR1 are read from physical sector S1 only if more recent data bytes corresponding to the logical address have not been already been written to physical sector S2. That is, the operating system directs all reads and writes of data bytes corresponding to logical address range AR1 to physical sector S2, except in the case in which valid data bytes exist in physical sector S1 that do not exist in physical sector S2.

Between read and write operations, valid data bytes located in physical sector S1 (i.e., data bytes corresponding to a logical address that have not been newly written to physical sector S2) are transferred to physical sector S2. The sector transfer function uses access algorithm 40 to traverse a linked associated with the logical address to be transferred to locate the most recently written physical block corresponding to the logical address. The data bytes stored to the physical block are written to a physical block within physical sector S2. The linked link created in physical sector S1 does not need to transferred, and is therefore left in physical block S1. This has the result of creating shorter access times corresponding to logical addresses transferred from physical sector S1 to physical sector S2.

For each logical address written to physical sector S2 that was previously written to physical sector S1, and for each physical block corresponding to a logical address transferred from physical sector S1 to physical sector S2, a bit in drain tracking area 46 (shown in FIGS. 2 and 3) of physical sector S1 is written, indicating that data bytes corresponding to another logical address have been transferred or written to physical sector S2. The number of bits written in drain tracking area 46 allows the operating system to determine the value of a sector transfer pointer, which initially points to the first addressing location within block index 42 of sector S1. Based on the number of bits written to drain tracking area 46, the location of the sector transfer pointer can be determined. For each logical address written to physical sector S2, the sector transfer pointer is incremented to point to the next addressing location within block index 42. When all of the data bytes corresponding to logical addresses previously written to physical sector S1 have either been newly written to physical sector S2 or transferred to physical sector S2, as indicated by the sector transfer pointer, then the status of each physical sector is changed again as shown in FIG. 5D.

FIG. 5D shows the status of physical sector S1 and physical sector S2 following the completion of data transfer between physical sector S1 and physical sector S2. That is, when physical sector S1 no longer contains any valid data bytes corresponding to logical addresses within logical address range AR1. At this point, the sector transfer function changes the status of physical sector S1 from OLD to DEAD. The sector transfer function also removes the assignment of physical sector S1 to logical address range AR1. The sector transfer function changes the status of physical sector S2 from CHILD to ADULT. Assigning physical sector S1 to a status of DEAD indicates to the operating system that no valid data exists in physical sector S1, and that physical sector S1 should be erased as soon as possible. Assigning physical sector S2 to a status of ADULT indicates to the operating system that all read and write operations corresponding to address range AR1 should be directed only to physical sector S2. That is, it is no longer necessary to check if valid data still exists in physical sector S1.

FIG. 5E shows status of physical sectors S1 and S2 following the completion of the sector transfer operation shown in FIGS. 5A-5D. The status of sector S1 is changed to ERASED after all data bits in sector S1 have been initialized to a logic level of "1". As discussed above, a sector represents the smallest location in flash memory that can be erased without erasing adjacent locations. At some later point in time, when another physical sector reaches its threshold capacity for data storage, then physical sector S1 can be used in a sector transfer operation, this time as a CHILD sector. As shown in FIGS. 5A-5E, physical sectors progress in sequence through the various statuses, from ERASED, to CHILD, to ADULT, to OLD, to DEAD. The status of each physical sector is stored both within flash module 16 and in sector array 36. The status of a particular physical sector is stored in housekeeping area 48 of the physical sector. Because data bits can only be written from a logic value of "1" to a logic value of "0", the status of each sector is stored in the following format.

Erased: FFh=(1111 1111)
Child: 77h=(0111 0111)
Adult: 33h=(0011 0011)
Old: 11h=(0001 0001)
Dead: 00h=(0000 0000)

When a physical sector set to DEAD status is erased, the status of the physical sector stored in housekeeping area 48 is also erased or initialized to a logic level of "1", and therefore automatically assigning the physical sector to a status of ERASED.

As illustrated in FIGS. 5A-5E, logical address ranges are dynamically assigned to physical sectors S1-S31 of flash module 16 using the sector transfer function. Dynamically assigning logical address ranges to physical sectors S1-S31 provides benefits to embedded system 10. As discussed above, during a sector transfer operation, linked lists formed due to multiple writes of data bytes corresponding to a particular logical address within a first physical sector are condensed to a single physical block when transferred to a second physical sector. This decreases associated access times for read and write operations to the second physical sector. Another benefit of dynamically assigning logical address ranges to physical sectors S1-S31 is this provides "wear leveling" of physical sectors S1-S31 within flash module 16. Physical sectors S1-S31 within flash memory module 16 can only be erased a fixed number of times, after which time they can no longer retain data. Therefore, it is advantageous to use each of the physical sectors evenly, to avoid erasing particular physical sectors more often than others. For example, it is not uncommon for a particular logical address to be written more often than other logical addresses. If the particular logical address is always assigned to the same physical sector, that physical sector will need to be erased more often that other physical sectors. By dynamically assigning logical addresses AR1-AR25 to physical sectors S1-S31 during the sector transfer operation, logical addresses are assigned to different physical sectors S1-S31 at different points in time.

Other aspects of the operating system include formatting and configuration functions. A software entity within the operating system called a format routine is responsible for formatting a flash memory that is either new or has previously been corrupted. The format routine erases all physical sectors S1-S31 of flash module 16, and assigns all address ranges AR1-AR25 to individual physical sectors S1-S31. The format routine also writes the address range number AR1-AR25 to the physical sector assigned that address range, as well as the sector status (ERASED, CHILD, ADULT, OLD or DEAD) to each of the physical sectors S1-S31. Both of these values are stored in housekeeping region 48 of physical sectors S1-S31. Fill tracking area 44 used to store the position of write pointer 58 and drain tracking area 46 used to store the progress of the sector transfer pointer are naturally initialized to the correct position when each sector is initially erased. An offset is added to the value stored by write pointer 58, in order to move write pointer 58 from the first address within each sector (which is reserved for block index 42) to the beginning of physical blocks PB1-PB1632. No offset is added to the sector transfer pointer, because after initialization it points to the beginning of block index 42. The formatting routine also writes a number of variables to sector array 36 and address array 34. The physical address of each physical sector S1-S31, along with the status of each physical sector S1-S31, the position of write pointer 58 in each physical sector S1-S31, and the position of the sector transfer pointer is written to sector array 36. While these values are also stored within each physical sector S1-S31 in flash module 16, storing these select variables to sector array 36 allows for faster access.

If the flash chip has been previously formatted, then a sector mapping routine is run by the operating system at power up of embedded system 10. The sector mapping routine reads the sector status and address range number AR1-AR25 stored to housekeeping area 48 of each physical sector S1-S31. It also reads fill tracking area 44 and drain tracking area 46 to determine the position of write pointer 58 and the sector transfer pointer corresponding to each physical sector S1-S31. The physical address, the physical sector status, write pointer 58, and the sector transfer pointer values corresponding to each physical sector S1-S31 are stored to sector array 36.

The sector mapping routine also formats address range array 34. Address range array 34 contains four fields for each of the twenty-five logical address ranges AR1-AR25 including: sector transfer field, CHILD field, ADULT field, and OLD field. The sector mapping routine reads data stored in housekeeping area 48 of each physical sector S1-S31 corresponding to the status of each physical sector. Physical sectors S1-S31 assigned a status of CHILD, ADULT or OLD are placed in the appropriate fields within address range array 34. For instance, if logical address range AR1 is assigned to physical sector S1, wherein physical sector S1 is assigned to ADULT status, then sector mapping routine writes physical sector S1 into the ADULT field corresponding to logical address range AR1. If logical address range AR2 is assigned to physical sector S2 having CHILD status, and physical sector S3 having OLD status, then the sector mapping routine writes physical sector S2 into the CHILD field corresponding to logical address range AR2 and writes physical sector S3 into the OLD field corresponding to logical address range AR2. The sector mapping routine then determines based on the physical sectors S1-S31 stored to the CHILD, ADULT, and OLD fields within address range array 34 whether all configurations are correct. For instance, when a physical sector is assigned to an address range (for instance, address range AR1) and has status of an ADULT sector, then no other physical sectors should be assigned to address range AR1. Conversely, if address range AR1 is assigned to one physical sector (for instance, sector S1) having CHILD status, then another physical sector must be assigned to address range AR1 having OLD status. The sector mapping routine therefore determines whether any invalid situations exist. If an invalid situation is detected by the sector mapping routine, the sector mapping routine calls the format routine to re-initialize the physical sectors involved.

An operating system for embedded applications making use of flash memory has been described. Although the present invention has been described with reference to preferred embodiments, workers skilled in the art will recognize that changes may be made in form and detail without departing from the spirit and scope of the invention. For example, the present invention is not limited to numerical values assigned in the above description. For instance, in other embodiments the number of bytes written to flash module 16 may be more or less than thirty-two bytes at a time. Likewise, the number of physical sectors making up flash module 16 may be greater or less than the thirty-one sectors described above. A number of other numerical values were assigned to components in the above description for ease of understanding, but the present invention is not limited to these examples.

The invention claimed is:

1. A byte-oriented method of utilizing flash memory, the byte-oriented method comprising:
   writing a new byte of data corresponding to a first logical address to a current physical block in the flash memory identified by location data stored to a write pointer;
   writing the location data stored by the write pointer to a frame vector area of a first previous physical block written with data bytes corresponding to the first logical address if a first number of intervening physical blocks between the first previous physical block and the current physical block have been written with data bytes corresponding to the first logical address;
   writing the location data stored by the write pointer to a standard vector area of a second previous physical block written with data bytes corresponding to the first logical address if the first number of intervening physical blocks have not been written with data bytes corresponding to the first logical address, wherein writing the location data to either the frame vector area or the standard vector area results in the current physical block being added to a dynamic linked list of physical blocks written with data bytes corresponding to the first logical address; and
   incrementing the location data stored to the write pointer to identify an unwritten physical block immediately following the current physical block.

2. The byte-oriented method of claim 1, further including:
   writing the location data stored by the write pointer to a super-frame vector area of a third previous physical block written with data bytes corresponding to the first logical address if a second number of intervening physical blocks between the third previous physical block and the current physical block have been written with data bytes corresponding to the first logical address.

3. The byte-oriented method of claim 1, further including:
   locating a most recently written physical block written with current data bytes corresponding to the first logical address.

4. The byte-oriented method of claim 3, further including:
   reading a current byte of data located within the most recently written physical block based on a particular logical address selected from a range of logical addresses including the first logical address.

5. The byte-oriented method of claim 3, further including:
   selecting from the current data bytes valid data bytes written to the most recently written physical block and corresponding to logical addresses not being updated by the new byte of data being written with respect to the first logical address, and adding the valid data bytes to the new byte of data to be written to the current physical block to ensure the valid data bytes corresponding to the logical addresses not being updated are retained when writing the new byte of data corresponding to the first logical address to the current physical block.

6. The byte-oriented method of claim 3, wherein locating a most recently written physical block written with data bytes corresponding to the first logical address includes:
   a. locating a first physical block written with data bytes corresponding to the first logical address based on the first logical address, wherein the first physical block represents a beginning of the dynamic linked list corresponding to the first logical address;
   b. accessing the first physical block written with data corresponding to the first logical address, wherein the first physical block becomes a currently accessed physical block;
   c. locating a first intervening physical block in the dynamic linked list written subsequent to the currently accessed physical block and corresponding to the first logical address based on values stored in the frame vector area of the currently accessed physical block;
   d. accessing the first intervening physical block written with data bytes corresponding to the first logical address, wherein the first intervening physical block becomes the currently accessed physical block;
   e. repeating steps 'c' and 'd' until the frame vector area of the currently accessed physical block has no values in the frame vector area;
   f. locating a second intervening physical block in the dynamic linked list written successively after the currently accessed physical block and corresponding to the first logical address based on values stored in the standard vector area of the currently accessed physical block;
   g. accessing the second intervening physical block written with data bytes corresponding to the first logical address, wherein the second intervening physical block becomes the currently accessed physical block; and
   h. repeating steps 'f' and 'g' until the standard vector area of the currently accessed physical block contains no values stored in the standard vector area, wherein when the standard vector area of the currently accessed physical block contains no values, then the currently accessed physical block is the most recently written physical block corresponding to the first logical address.

7. The byte-oriented method of claim 1, further including:
monitoring how many physical blocks within a first physical sector are written with data bytes, wherein the first physical sector is assigned to a first logical address range; and
transferring valid data bytes written to the first physical sector to a second physical sector when a number of physical blocks written to the first physical sector exceeds a threshold value.

8. The byte-oriented method of claim 7, wherein transferring valid data bytes from the first physical sector to a second physical sector includes:
   assigning the first logical address range to the second physical sector;
   writing new data corresponding to logical addresses within the first logical address range to physical blocks within the second physical sector;
   locating valid physical blocks within the first sector having valid data written with respect to each of the logical addresses within the first range of addresses; and
   transferring the valid data located in the valid physical blocks written with respect to each of the logical addresses within the first logical address range to the physical blocks within the second physical sector.

9. A method of utilizing flash memory, the method comprising:
   assigning logical address ranges to physical sectors, wherein each of the logical address ranges is assigned to one of the physical sectors, and wherein the physical sectors outnumber the logical address ranges resulting in some of the physical sectors being unassigned;
   writing data bytes corresponding to a logical address range to physical blocks located within an assigned physical sector, wherein a set of physical blocks written with data bytes corresponding to a particular logical address within the logical address range are connected by a dynamic linked list corresponding to the particular logical address;
   monitoring how many of the physical blocks within the assigned physical sector have been written with data;
   assigning the logical address range to the new physical sector;
   transferring valid data bytes stored in the physical blocks within the assigned physical sector to a new physical sector when the physical blocks within the assigned physical sector written with data exceeds a threshold value; and
   erasing the assigned physical sector after valid data bytes have been transferred from the assigned physical sector to the new physical sector.

10. The method of claim 9, wherein writing data bytes corresponding to a logical address range to physical blocks located within an assigned physical sector includes:
   writing current data bytes corresponding to a first logical address within the logical address range to a first physical block identified by location data stored in a write pointer;
   adding the first physical block to a first linked list corresponding to the first logical address; and
   incrementing the location data stored in the write pointer to identity a next available unwritten physical block.

11. The method of claim 10, wherein adding the first physical block to a first linked list corresponding to the first logical address includes:
   linking the first physical block to a first previously written physical block if a first number of intervening physical blocks have been written with respect to the first logical address;
   linking the first physical block to a second previously written physical block if the first number of intervening physical blocks has not been written and a second number of intervening physical blocks has been written with respect to the first logical address; and
   linking the first physical block to a third previously written physical block if the first and second number of intervening blocks has not been reached.

12. The method of claim 9, further including accessing a most recently written physical block corresponding to the particular logical address using the dynamic linked list, wherein accessing the most recently written physical block includes:
   a. locating a first physical block written with data corresponding to the particular logical address based on the particular logical address, wherein the first physical block represents a beginning of the linked list corresponding to the particular logical address, wherein the first physical blocks becomes a current physical block;

b. accessing a first subsequent physical block written with respect to the particular logical address based on location data stored to a first vector area of the current physical block, wherein the first subsequent physical block and the current physical block are separated by a first number of intervening physical blocks written with respect to the particular logical address, and wherein the first subsequent physical block becomes the current physical block;

c. repeating step 'b' until the current physical block has no location data stored in the first vector area;

d. accessing a second subsequent physical block written with respect to the particular logical address based on location data stored to a second vector area of the current physical block, wherein the second subsequent physical block and the current physical block are separated by a second number of intervening physical blocks written with respect to the particular logical address, and wherein the second subsequent physical block becomes the current physical block;

e. repeating step 'd' until the current physical block has no location data stored in the second vector area;

f. accessing a third subsequent physical block written with respect to the particular logical address based on location data stored to a third vector area of the current physical block, wherein the third subsequent physical block is written successively after the current physical block, and wherein the third subsequent physical block becomes the current physical block; and g. repeating step 'f' until the current physical block has no location data stored in the third vector area, wherein when the current physical block has no location data stored in the third vector area, the current physical block represents the most recently written physical block written with respect to the particular logical address.

13. The method of claim 9, wherein transferring valid data bytes stored in the physical blocks within the assigned physical sector to a new physical sector when the physical blocks within the assigned physical sector written with data exceeds a threshold value includes:

a. assigning the logical address ranges to the new physical sector;

b. accessing a current physical block most recently written with data bytes corresponding to a current logical address identified by a sector transfer pointer if data bytes corresponding to the current logical address have previously been written to the first sector;

c. writing data bytes stored in the current physical block corresponding to the current logical address identified by the sector transfer pointer to a new physical block located within the second physical sector;

d. incrementing the sector transfer pointer to identify a next logical address to be transferred, wherein the next logical address becomes the current logical address; and e. repeating steps 'b' through 'd' until data bytes corresponding to each logical address has been transferred.

14. An embedded system, comprising:

a flash memory comprising a plurality of physical sectors, each of the plurality of physical sectors including a plurality of physical blocks and a block index;

a controller connected to the flash memory and running an operating system, wherein the operating system includes:

means for writing new data corresponding to a first logical address to a current physical block in a first physical sector of the flash memory identified by location data stored to a write pointer;

means for storing the location data stored by the write pointer to an area of the block index corresponding to the first logical address if data corresponding to the first logical address has not been previously written to this sector;

means for storing the location data stored by the write pointer to a previously written physical block holding data corresponding to the first logical address if data corresponding to the first logical address has been previously written to the physical sector, wherein each of the plurality of physical blocks includes a frame vector area to store a first location of a subsequently written physical block and a standard vector area to store a second location of a successively written physical block such that physical blocks holding data corresponding to the first logical address are linked by a dynamic linked list; and means for incrementing the location data stored by the write pointer to identify an unwritten physical block immediately following the current physical block.

15. The embedded system of claim 14, wherein the means for storing the location data:

writes the location of the current physical block to a frame vector area of a first previous physical block written with data corresponding to the first logical address if a number of intervening physical blocks between the first previous physical block and the current physical block have been written with respect to the first logical address; and writes the location of the current physical block to the standard vector area of a second previous physical block if the threshold number of intervening physical blocks written with respect to the first logical address has not been reached.

16. The embedded system of claim 15, wherein the operating system further includes:

a means for locating a most recently written physical block corresponding to the first logical address:

a. uses location data stored in the frame vector area of a first physical block to locate subsequently written physical blocks corresponding to the first logical address and separated by a number of intervening physical blocks corresponding to the first logical address;

b. repeats step 'a' until the frame vector area of a subsequently written physical block is located with no data in the frame vector area;

c. uses location data stored in the standard vector area to locate successively written physical blocks corresponding to the first logical address; and d. repeats step 'c' until the standard vector area of a successively written physical block is located with no data in the standard vector area, wherein the successively written physical block with no data in the standard vector area represents the most recently written data corresponding to the first logical address.

17. The embedded system of claim 14, wherein the operating system further includes:

means for transferring data from the first physical sector to a second physical sector when a number of physical blocks written to the first physical sector exceeds a threshold value.

18. The embedded system of claim 17, further including:
a sector transfer pointer initialized to a beginning of the block index, wherein the beginning of the block index represents a first logical address assigned to the physical sector, wherein the means for transferring data from the first physical sector to a second physical sector:
   a. locates a most recently written physical block corresponding to a logical address identified by the sector transfer pointer if data bytes corresponding to the logical address have previously been written to the first sector;
   b. writes data bytes stored in the most recently written physical block corresponding to the logical address identified by the sector transfer pointer to a new physical block located within the second physical sector;
   c. increments the sector transfer pointer to identify the next logical address to be transferred; and
   d. repeats steps 'a' through 'c' until data bytes corresponding to each logical address has been transferred.

19. The embedded system of claim 17, wherein said embedded system is part of a data memory module (DMM).

20. The embedded system of claim 19, wherein said embedded system is part of a DMM on an aircraft.

* * * * *

UNITED STATES PATENT AND TRADEMARK OFFICE
CERTIFICATE OF CORRECTION

PATENT NO. : 7,571,275 B2 Page 1 of 1
APPLICATION NO. : 11/216749
DATED : August 4, 2009
INVENTOR(S) : Les Nelson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Seventh Day of September, 2010

David J. Kappos
*Director of the United States Patent and Trademark Office*